(12) United States Patent
Begou et al.

(10) Patent No.: US 11,230,148 B2
(45) Date of Patent: Jan. 25, 2022

(54) METHOD FOR EVALUATING THE FIRMNESS OF A GROUND

(71) Applicant: COMPAGNIE GENERALE DES ETABLISSEMENTS MICHELIN, Clermont-Ferrand (FR)

(72) Inventors: Pierre-Alain Begou, Clermont-Ferrand (FR); Antoine Paturle, Clermont-Ferrand (FR); Jean-Michel Vacherand, Clermont-Ferrand (FR); Oussama Bouhadida, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/647,141

(22) PCT Filed: Sep. 14, 2018

(86) PCT No.: PCT/FR2018/052257
§ 371 (c)(1),
(2) Date: Mar. 13, 2020

(87) PCT Pub. No.: WO2019/053384
PCT Pub. Date: Mar. 21, 2019

(65) Prior Publication Data
US 2020/0276870 A1    Sep. 3, 2020

(30) Foreign Application Priority Data

Sep. 14, 2017  (FR) ..................... 1758531

(51) Int. Cl.
*B60C 23/06*    (2006.01)
*B60C 19/00*    (2006.01)

(52) U.S. Cl.
CPC ...... *B60C 23/064* (2013.01); *B60C 2019/004* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 5,610,330 A * 3/1997 Fricke ............... G01M 7/022
73/146
6,112,586 A * 9/2000 Fricke ............... G01M 13/027
73/146
(Continued)

FOREIGN PATENT DOCUMENTS

| EP | 0 887 211 A1 | 12/1998 |
| EP | 1820670 A1 | 8/2007 |
| EP | 3031632 A1 | 6/2016 |

OTHER PUBLICATIONS

International Search Report dated Nov. 23, 2018, in corresponding PCT/FR2018/052257 (4 pages).
(Continued)

*Primary Examiner* — Andre J Allen
(74) *Attorney, Agent, or Firm* — Venable LLP (57) ABSTRACT

A method for evaluating the firmness of the ground on which is running a vehicle equipped with at least one mounted assembly having a radial stiffness $k_{radial}$ comprising a tyre casing having a crown, two sidewalls and two beads, equipped with a sensor sensitive to the circumferential curvature and positioned in line with the crown, comprises the following steps: Estimating a value of the curvature $\rho_A$ of the tire casing corresponding to first steady-state conditions of the tire casing in contact with the ground; and Evaluating the relative firmness of the ground with respect
(Continued)

to the radial stiffness $k_{radial}$ of the mounted assembly as being a function of the value of the curvature $\rho_A$ of the tire casing.

16 Claims, 3 Drawing Sheets

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28; G01B 7/26; G01B 11/16; G01B 11/24; G01B 11/0608; G01B 11/14; G01B 11/167; G01B 11/22; G01B 11/25; G01B 11/2518; G01B 21/04; G01B 21/042; G01B 21/20; G01B 21/30; G01B 3/30; G01B 5/30; G01B 7/06; G01B 7/14; G01B 7/282
USPC .................................................. 73/146–146.8
See application file for complete search history.

(56) References Cited

U.S. PATENT DOCUMENTS

| | | |
|---|---|---|
| 7,502,124 B2 | 3/2009 | Muhlhoff et al. |
| 2003/0154007 A1 | 8/2003 | Evans et al. |
| 2007/0204684 A1 | 9/2007 | Muhlhoff et al. |

OTHER PUBLICATIONS

Copending U.S. Appl. No. 16/625,366, filed Jun. 4, 2018, (available on USPTO system).

* cited by examiner

METHOD FOR EVALUATING THE FIRMNESS OF A GROUND

FIELD OF THE INVENTION

The present invention relates to a method for evaluating the firmness of ground on which a mounted assembly comprising a tyre casing equipped with a device for measuring the deformation of the tyre casing is running.

TECHNOLOGICAL BACKGROUND

In certain application scenarios, it is of prime importance to consider the firmness of the ground on which the tyre casing is pressing in order to adapt the conditions of use of the mounted assembly to suit the parameters of the ground in order not to damage the ground and/or the mounted assembly and in particular the tyre casing. In addition, qualifying the ground and notably the firmness thereof certainly becomes important to anyone directly or indirectly exploiting this information, such as farmers for example. In the case of roads with an asphalt or concrete pavement, the structure of which rests on firm foundations in order to obtain a certain degree of stiffness, the standardized conditions of use of the mounted assembly minimize interactions between the ground and the mounted assembly. Because of this, the firmness of the ground which corresponds to the stiffness of the ground over a certain thickness with respect to the exterior surface, is only of little interest in these specific cases. By contrast, in the case of ground referred to as loose ground, the interactions between the ground and the mounted assembly are far greater, such as for example on stony tracks, sandy soil, and agricultural fields. It is important to define the firmness of such ground in order to regulate the conditions of use of the mounted assembly, such as the inflation pressure, the load carried or the running speed, in order, on the one hand, to optimize the effectiveness of the mounted assembly in its mobility function and, on the other hand, not to modify or even damage the characteristics of the ground. It is chiefly this type of application that the invention addresses.

The soil or the ground is a collection of three phases: a gas phase, a liquid phase and a solid phase in which the proportions between the three phases define the characteristics of the ground. If the soil is sensitive to water content, the soil exhibits three types of status qualified as a solid, plastic and liquid depending on its water content. The transition from one state to another determines the ease with which the soil can be worked or the ease of mobility over the soil of this ground.

Various laboratory tests make it possible to determine the water content sensitivity of soil using, for example, Atterberg limits that make it possible to define the zones of transition of soil between the three states according to the water content in accordance with standard NFP94057. Finally, other standardized tests on real soil make it possible to identify the hydrous state of a given soil such as by evaluating the optimum Proctor number in accordance with standard NFP94093, or by evaluating the IBI (which stands for "Immediate Bearing Index") in accordance with NFP94078. However, these static tests are not easy to interpret. They are dependent both on the nature of the soil and on its water content. The second parameter necessarily changes between the seasons of the year or between shorter periods. As a result, the need for an instant measurement of the firmness of the ground (soil) at the moment that the vehicle directly drives over it has been expressed. This instant information regarding the firmness of the ground allows the conditions of use of the vehicle such as, for example, the speed of running or the inflation pressure to be adapted to suit the characteristics of the ground.

Furthermore, the interactions between the ground and the tyre casing exist and can be observed directly through physical parameters of the tyre casing such as the size of the contact patch. Various measurement means carried on board inside the tyre casing have been developed in recent years in order to evaluate these physical parameters. For example, EP3031632A2 uses a motion detector to identify indirectly the circumferential azimuths of the tyre that correspond to entering and leaving the contact patch. As a result, an evaluation of the size of the contact patch is made, based on localized measurements. Thus, the use of a tyre casing as a detector of physical parameters relating to the interaction between a mounted assembly and the ground has been demonstrated. Nevertheless, no connection has been made between the firmness of the ground and the parameters concerned with the deformation of a tyre casing.

The invention seeks to propose a method for instantly measuring the firmness of the ground through a measurement on the tyre casing of a mounted assembly of a vehicle under conditions of use, intended for the driver of the vehicle, without detracting from the efficiency of his work.

TECHNICAL DEFINITIONS

The following definitions apply in what follows:

"axial direction", the direction along the length of the transport vehicle from the front of the vehicle towards the rear thereof, "vertical direction", the direction along the normal to the ground, "transverse direction", the direction that forms a direct trihedron with the vertical and axial directions, "mounted assembly", a device comprising at least one tyre casing and one wheel made up of a wheel centre and of a rim in a mounted and inflated state.

SUMMARY OF THE INVENTION

The invention relates to a method for evaluating the firmness of the ground on which is running a vehicle equipped with at least one mounted assembly having a radial stiffness $k_{radial}$. This mounted assembly comprises a tyre casing having a crown, two sidewalls and two beads. The tyre casing is equipped with a sensor sensitive to the circumferential curvature and positioned in line with the crown. The method for evaluating the firmness of the ground comprises the following steps:

Estimating a value of the curvature $\rho_A$ of the tyre casing corresponding to first steady-state conditions of the tyre casing in contact with the ground;

Evaluating the relative firmness of the ground with respect to the radial stiffness $k_{radial}$ of the mounted assembly as being a function of the value of the curvature $\rho_A$ of the tyre casing in the first steady-state conditions.

What is meant here by a "sensor sensitive to the circumferential curvature" is that the sensor delivers a physical parameter directly or indirectly connected with the curvature of the tyre casing situated in line with the sensor in the circumferential direction of the tyre casing. The sensor is equipped with all the necessary components for generating a signal that can be exploited in analogue or in digital by an external system with sufficient spatial or temporal discretization to generate an output signal that can be likened to a signal of the square-wave type. This is a signal of which the abscissa value is a direct or indirect descriptor of the revolution of the wheel and the ordinate value is a direct or indirect descriptor of the circumferential curvature as observed by the sensor. This sensor may be a bending sensor of resistive type, a piezoelectric sensor sensitive to bending, an accelerometer of which the continuous component is proportional to the radial acceleration of the tyre casing or any other sensor based on a mechanical, electrical, magnetic or optical measurement that delivers a continuous component proportional to the circumferential curvature of the tyre casing.

What is meant here by "equipped" is that at least a part of the sensor is connected to the tyre casing. And what is meant here by the term "sensor" is the measurement device comprising both the active sensor as such and the additional components for generating a signal that can be exploited.

What is meant here by "optical sensor" is any device of the prior art for sensing the blistering of the surface of the tyre casing as it passes through the contact patch, by way of an optical measurement. In particular, in relation to an optical sensor, document EP1820670A1 describes a solution comprising, on the one hand, a calibrated pattern subjected to the deformation of a surface of the tyre casing, for example a part of the contact patch. On the other hand, the measurement device comprises lighting means, coupled to vision means, mounted on the rim of the wheel of the assembly mounted in a certain azimuthal position. Here, by way of example, these lighting and vision means are of the stereovision type. This device makes it possible to obtain visualization of the blistering of the surface of the tyre casing as the calibrated pattern passes through the contact patch. The calibration of the pattern makes it possible to infer therefrom the circumferential curvature of the surface of the tyre at the calibrated pattern situated for example in the contact patch.

What is meant here by "radial stiffness of the mounted assembly" is the dynamic stiffness of the mounted assembly which stiffness is generated by a radial movement imposed on the external surface of the crown in the elastic domain of the movements experienced by a tyre casing under nominal conditions of use. These conditions in particular set the imposed load and the inflation pressure. This dynamic stiffness is the ratio between the vertical force observed at the centre of the wheel of the mounted assembly and the vertical movement imposed on the crown of the tyre casing in the contact patch in the frequency range between 5 and 50 Hz in which range the mounted assembly behaves like a one-way spring, which corresponds to a measurement remote from the fundamental modes of the mounted assembly.

The type of sensor employed makes it possible to observe the curvature of the tyre casing which will develop at the moment at which the sensor is situated wholly in the contact patch. This sensor is not seeking to detect the variations in curvature at the transition zones of the casing making the transition from a state of the type reflecting contact with the ground to a state of the type reflecting no contact with the ground. It is seeking merely to identify the resulting curvature of the tyre casing when the zone of the tyre casing in line with the sensor is in the contact patch.

The signals from the sensor can be likened to a signal of the square-wave type from which the value representative of the plateau of the square wave can be extracted using suitable mathematical means. This value representative of the plateau reflects the mean curvature of the tyre casing in the contact patch. The isolated fronts of the square wave correspond to the measurement by the sensor of the curvature of the tyre casing in the transition zone marking the transitions between the two sets of steady-state conditions in terms of the boundary conditions applied to the zone of the mounted assembly situated in line with the sensor.

It is possible to evaluate the firmness of the ground with respect to the radial stiffness of the mounted assembly by using the value $\rho_A$ of the curvature of the tyre casing. This is because this curvature parameter is dependent both on the radial stiffness of the tyre casing, particularly the inflation pressure and the applied load, and also on the stiffness of the ground (soil). This relative firmness of the ground is of decisive benefit in evaluating the impact that the mounted assembly will have on the ground over which the mounted assembly is moving. Determining this parameter makes it possible to optimize as required the conditions of use of the mounted assembly in order to improve the mobility of the mounted assembly and minimize the influence that the mounted assembly has on the ground.

According to one preferred embodiment, the method for evaluating the firmness of the ground also comprises the following steps:

Estimating a value of the curvature $\rho_B$ of the tyre casing corresponding to second steady-state conditions of the tyre casing not in contact with the ground;

Evaluating the relative firmness of the ground with respect to the radial stiffness $k_{radial}$ of the mounted assembly as being a function of the value of the curvature $\rho_A$ under the first steady-state conditions and of the value of the curvature $\rho_B$ of the tyre casing under the second steady-state conditions.

Depending on whether the measurement is taken while the sensor sensitive to the curvature is either in the contact patch in which the tyre is in contact with the ground or outside of this contact patch, two distinct values will be obtained that will be referred to as the curvature of the tyre casing in contact with the ground $\rho_A$ or the curvature of the tyre casing not in contact with the ground $\rho_B$. These values of curvature under steady-state conditions correspond to the plateau zones of the square-wave signal generated by the sensor sensitive to the circumferential curvature.

Of course, the curvature values are dependent on the conditions of use of the tyre casing. In particular, these values are dependent on the inflation pressure, on the load being carried and on the rotational speed of the tyre casing. In addition, the value of curvature under steady-state conditions of the type reflecting contact with the ground is also sensitive to the stiffness of the ground. Thus, the differential between the two curvature values makes it possible to work back to the desired information regarding the firmness of the ground.

According to one preferred embodiment, the method for evaluating the firmness of the ground comprises the following steps:

Establishing the relative curvature C as being the ratio $\rho_A/\rho_B$;

Evaluating the relative firmness of the ground with respect to the radial stiffness $k_{radial}$ of the mounted assembly as being a function of the relative curvature C.

In particular, the connection between the relative firmness of the ground with respect to the radial stiffness $k_{radial}$ of the mounted assembly can be given by the following formula:

$$\frac{k_{ground}}{k_{radial}} = \frac{|1 + \alpha * C - (1 + \alpha) * C^2|}{\beta * C},$$

in which β is a polynomial function of the inflation pressure P of the mounted assembly of the following type: $\beta = \beta_1 * (P)^{\beta_2}$. The coefficients α, $\beta_1$ and $\beta_2$ are coefficients that are dependent on the mounted assembly.

The relative curvature of the ground is evaluated as being the ratio of the images of the curvatures between the two square waves, using in the denominator the one that corresponds to the steady-state conditions of the type reflecting not in the contact patch, using the following formula:

$$C = \frac{\rho_A}{\rho_B}$$

This relative curvature is comprised between 0 and 1. The zero value of C corresponds to a zero value of curvature in the contact patch, which can be likened to flat ground equivalent to high firmness of the ground. And a value of unity for C corresponds to identical curvatures in and not in the contact patch. This is manifested in an absence of contact patch during the revolution of the wheel in the sense of the tyre casing becoming flat. Thus, the tyre has the same curvature at every angular position on the revolution of the wheel and that corresponds to the maximum value for curvature in the steady-state condition zones corresponding to the casing in contact with the ground. The intermediate values correspond to intermediate curvatures of the tyre casing in the steady-state condition zones of the type reflecting contact with the ground.

It will be noted that the conditions of use of the mounted assembly such as, for example, the load being carried, the inflation pressure or the rotational speed have only a small influence on the relative curvature C of the tyre casing, which is governed chiefly by the firmness of the ground.

What is meant by "dependent on the mounted assembly" is that the very nature of the components of the mounted assembly such as at least the tyre casing or the wheel has a strong influence through their dimensional and material characteristics. By contrast, the conditions of use of the mounted assembly such as the inflation pressure, the applied load or the rotational speed, are weakly dependent parameters.

The relative firmness of the ground with respect to the radial stiffness of the mounted assembly is then defined directly by the following formula in which α, β1 and β2 are coefficients dependent on the mounted assembly and P is the inflation pressure of the mounted assembly:

$$\frac{k_{ground}}{k_{radial}} = \frac{|1 + \alpha * C - (1 + \alpha) * C^2|}{\beta_1 * P^{\beta_2} * C},$$

In addition, knowing the radial stiffness of the mounted assembly makes it possible to determine an absolute value for the firmness of the ground. This second parameter is an important agricultural data item for qualifying the soil of the ground and optimizing the exploitation thereof.

When the ground can be likened to a road with asphalt pavement of high firmness, the relative curvature value C tends towards 0. As a result, the firmness of the ground becomes great by comparison with the radial stiffness of the mounted assembly. Likewise, when the ground is of low firmness, the relative curvature value tends towards 1. The relative firmness of the ground with respect to the radial stiffness of the mounted assembly tends towards 0.

In addition, if the relative firmness of the same ground is measured by two different mounted assemblies, this will yield two relative-curvature parameters each one associated with one of the mounted assemblies. If, by way of a variation in mounted assembly, use is made of a simple variation in the inflation pressure of the one same mounted assembly, then the ratio of the dynamic stiffnesses between the mounted assemblies referenced 1 and 2 is given by the following equation, on the one hand from the model and on the other hand from the standard change in the stiffness of the mounted assembly with inflation pressure.

$$\frac{k_{radial}^1}{k_{radial}^2} = \left(\frac{[(1 + \alpha * C_2 - (1 + \alpha) * C_2^2) * (\beta_1 * P_1^{\beta_2} * C_1)]}{[(1 + \alpha * C_1 - (1 + \alpha) * C_1^2) * (\beta_1 * P_2^{\beta_2} * C_2)]}\right) = \left(\frac{P_1}{P_2}\right)^\gamma$$

Thus, identifying the behaviour of the stiffness of a mounted assembly with respect to inflation pressure on flat ground, coupled with measurements on different loose grounds makes it possible to evaluate the coefficient $\beta_2$ of the model.

In addition, if the relative firmness of two different grounds referenced 1 and 2 is measured using the same mounted assembly, therefore assuming the same inflation pressure, this will yield two relative-curvature parameters each one associated with one of the pressures. The ratio of the firmnesses of the grounds referenced 1 and 2 is given by the following equation:

$$\frac{k_{ground}^1}{k_{ground}^2} = \left(\frac{[(1 + \alpha * C_1 - (1 + \alpha) * C_1^2) * (\beta_1 * P^{\beta_2} * C_2)]}{[(1 + \alpha * C_2 - (1 + \alpha) * C_2^2) * (\beta_1 * P^{\beta_2} * C_1)]}\right) =$$
$$\left(\frac{(1 + \alpha * C_1 - (1 + \alpha) * C_1^2) * C_2}{(1 + \alpha * C_2 - (1 + \alpha) * C_2^2) * C_1}\right)$$

Thus, simply calibrating the mounted assembly for the same inflation pressure on the grounds of known firmness makes it possible to identify the parameter α of the model.

According to one advantageous embodiment, with the tyre casing defining a contact patch, by applying nominal conditions of use of the mounted assembly, this contact patch having a dimension Ladc in the axial direction of the mounted assembly, the sensor measures the mean circumferential curvature over a length comprised between 10% and 80% of the dimension Ladc.

What is meant here by "nominal conditions of use of a tyre casing" are the standardized conditions for the tyre casing in accordance with the ETRTO standard so as to define the geometric envelope of the tyre casing. The nominal conditions relate to the load being carried, the inflation pressure and the dimensions and characteristics of the wheel on which the tyre casing is mounted. For a given tyre casing, these conditions specify a contact patch on firm flat ground including a maximum length Ladc of contact patch.

If the sensor is at least linear rather than taking spot readings, the measurement taken by the sensor corresponds to the mean curvature of the tyre casing over the length of the sensor. This type of sensor is far less sensitive to irregularities in stiffness originating from the ground or from the tyre casing or from the mounted assembly. It therefore provides information that is statistically more reliable regarding the firmness of the ground in a homogenized and direct form. In addition, this type of sensor generates a greater dynamic range in the measurement of curvature between the steady-state conditions corresponding to free rotation or rotation in contact with the ground. This measurement dynamic range makes it possible to evaluate the firmness of the ground with greater finesse. In general, the larger the size of the sensor, the better will be the measurement dynamic range and the precision of the homogenized value of the firmness of the ground. Of necessity, in order to obtain a signal emitted by the sensor that can be exploited by the method it is necessary for the length of the sensor to be shorter than the length of the contact patch under the ground-measurement conditions.

According to another advantageous embodiment, with the tyre casing defining a contact patch, this contact patch having a dimension ladc in the transverse direction of the mounted assembly, the sensor measures the mean circumferential curvature over a width comprised between 10% and 80% of the dimension ladc.

If the sensor is at least an area rather than a linear sensor, whether the sensor is a single sensor or a combination of sensors arranged transversely, the measurement taken by the sensor corresponds to the mean curvature of the tyre casing over the length and the width of the sensor. This type of sensor is far less sensitive to irregularities in stiffness originating from the ground or from the tyre casing or from the mounted assembly. It therefore provides information that is statistically more reliable regarding the firmness of the ground in a homogenized and direct form. Of necessity, in order to obtain a signal emitted by the sensor that can be exploited by the method it is necessary for the width of the sensor to be less than the width of the contact patch under the ground-measurement conditions.

As a preference, the sensor measures the mean curvature of a zone of the crown of the tyre casing in contact with the ground that is homogeneous in terms of radial stiffness.

For the sake of the quality of the measurement information, it is beneficial for the sensor to be positioned in line with a homogeneous zone of the crown of the tyre casing. Now, the crown of a tyre casing is a zone that is complex because of the various functions it has to perform. In particular, in order to improve contact between the rubber and the ground, the crown notably comprises a tread which is the element in direct contact with the ground. This tread is often made up of longitudinal and/or transverse sequences of voids and of projecting pattern elements that locally modify the radial stiffness of the tyre casing. The sensor therefore needs to be positioned in line with a zone that is homogeneous in terms of stiffness and notably in terms of radial stiffness.

As a preference, the sensor measures the mean curvature of a zone of the crown in line with a tread pattern element of the tyre casing.

Likewise, for the sake of the quality of the measurement information, it is preferable for the sensor to be positioned in line with a tread pattern element. In this way, it is possible to ensure the homogeneity of the radial stiffness of the tyre casing and therefore of the mounted assembly. In addition, the tread pattern element is a projecting element of the tread in direct contact with the ground. The other elements of the tread, such as the voids for example, although they too interact with the ground, are also influenced by the other parts of the tread such as the projecting elements. As a result, the measurement obtained when the sensor is in line with a tread pattern element, therefore has greater dynamic range, making for a more precise intrinsic qualification of the ground.

According to one preferred embodiment, the estimation of the curvature values corresponding to the first and second steady-state conditions in terms of the boundary conditions of the tyre casing comprises the following steps:

Obtaining a recorded signal from the sensor sensitive to curvature corresponding to N revolutions of the wheel of the mounted assembly, being an integer greater than 1;

Identifying in the recorded signal the 2N local maxima $Y_{2N}$, and their corresponding abscissa values $X_{2N}$;

For any j, j being an integer strictly greater than 1 and strictly less than 2N:

If $(X_j - X_{j-1}) < (X_{j+1} - X_j)$, isolating a first signal in the recorded signal between the central maximum $(X_j, Y_j)$ and the previous maximum $(X_{j-1}, Y_{j-1})$;

identifying the steady-state conditions curvature value denoted $\rho_j$ in the first signal;

isolating a second signal in the recorded signal between the central maximum $(X_j, Y_j)$ and the next maximum $(X_{j+1}, Y_{j+1})$;

identifying the steady-state conditions curvature value denoted $\rho_{j+1}$ in the at least one second signal;

Else, isolating a first signal in the recorded signal between the central maximum $(X_j, Y_j)$ and the next maximum $(X_{j+1}, Y_{j+1})$;

identifying the steady-state conditions curvature value denoted $\rho_j$ in the at least one first signal;

isolating a second signal in the recorded signal between the central maximum $(X_j, Y_j)$ and the previous maximum $(X_{j-1}, Y_{j-1})$; and identifying the steady-state conditions curvature value denoted $\rho_{j+1}$ in the at least one second signal; and Establishing the curvature of the tyre under conditions of contact with the ground $\rho_A$ as being the mean of the at least one curvature value $\rho_j$ and the curvature of the tyre casing under conditions not in contact with the ground $\rho_B$ as being the mean of the at least one curvature value $\rho_{j+1}$;

This method for obtaining an evaluation of the curvatures of the mounted assembly under steady-state conditions in terms of the boundary conditions applied to the tyre casing relies on the generation of a signal emitted by the sensor of the type exhibiting multiple square-wave pulses as the wheel turns.

A first signal emitted by the sensor corresponding to a finite number N of revolutions of the wheel is isolated. The detection of the rotation of the mounted assembly is performed using a sensor available in the prior art incorporated into the tyre casing, the mounted assembly or the vehicle, such as, for example, a revolution marker or an encoder.

Upon the emission of this signal all that is required is to identify the curvature value corresponding to the steady-state conditions by using signal processing means to extract the useful information from the signal.

This emitted signal is isolated beforehand as elementary signals of the simple square-wave type in order to identify the curvature value for each set of steady-state conditions more easily. The chopping is performed by isolating the signal between two local maxima of the signal. Each local maximum corresponds to a transition zone marking the transition from a first set of steady-state conditions to a second set of steady-state conditions.

Next, a simple quantitative analysis of the interval on the ordinate axis of the signals between the local maxima makes it possible directly to identify the steady-state conditions of the type reflecting contact with the ground with respect to the steady-state conditions of the type reflecting free rotation. Specifically, because of the circular geometry of a mounted assembly, the angular sector of the contact patch of a tyre casing is necessarily narrower than the angular sector of the tyre casing not in the contact patch.

Finally, a mean of the curvature values per set of steady-state boundary conditions applied to the mounted assembly is calculated. That makes it possible to make the curvature value per set of steady-state conditions statistically robust. This operation is of greater importance in steady-state conditions of the type reflecting contact with the ground where the irregularities originating chiefly from the ground but also from the mounted assembly may naturally introduce spread into the evaluation of the curvature.

For preference, the obtaining of the recorded signal from the sensor sensitive to the curvature corresponding to N revolutions of the wheel of the mounted assembly, comprises the following steps:

Recording a signal emitted by the sensor sensitive to the curvature corresponding to one revolution of the wheel of the mounted assembly;

Periodizing the signal emitted over N periods, N being an integer greater than 1;

In order to make best use of the memory space associated with the sensor, it is beneficial only to extract the signals from the sensor over a revolution of the wheel corresponding for example to a time interval deltaT dependent on the rotational speed of the mounted assembly. Next, the recorded signal corresponding to N revolutions of the wheel is obtained by periodizing the signal emitted by the sensor over just one revolution of the wheel.

This method is particularly well-suited to sampling ground the characteristics of which have already been measured. In addition, if the past characteristics of the ground in one plot have revealed a certain spatial homogeneity of the ground, a spot measurement will suffice for the temporal monitoring of a plot of ground.

According to another particular embodiment, with the sensor outputting an indirect parameter for the circumferential curvature of the tyre casing involving a parameter that is variable, the method comprises an additional step Correcting the indirect parameter on the signal recorded using the variable parameter In the event that the parameter output by the sensor is influenced by parameters which change over the course of the revolution of the wheel and over the course of time at the moment of measurement capture, such as, for example, the angular velocity of the mounted assembly or the temperature, these variations must be taken into account. Likewise, if the response of the sensor is not a linear response to the applied influence, then the sensor calibration curve must be taken into consideration. Thus, it is possible to correct the signal recorded by the sensor, such as for example the radial acceleration in the case of an accelerometer dependent both on the curvature and on the speed of travel of the mounted assembly, by incorporating the effects of the variation of these parameters into the recorded signal. First of all, the measurements of the variable parameters must be evaluated at the same time as the signal recorded by the sensor sensitive to the circumferential curvature, using additional devices if necessary. These additional devices are both measurement devices and devices for synchronizing all of the measurement signals.

Next, with the aid of these additional measurements, the variations in these parameters must be incorporated into the output parameter from the sensor sensitive to the curvature. The new recorded signal is thus cleaned of parasitic fluctuations. This then yields a sensor that directly measures the circumferential curvature. The shape of the new signals is characteristic of what is expected, a multi-square-wave signal. The signal processing performed in the general method can then be applied.

According to a highly preferred embodiment, the curvature of the tyre casing under conditions of contact with the ground $\rho_j$ is evaluated on a signal reduced from the first signal.

The condition governing the length of the intervals allows the square-wave corresponding to the steady-state of contact with the ground to be isolated in the recorded signal. Next, this square wave which comprises first and second isolated fronts reflecting the transition of the sensor between a first set of steady-state conditions not in contact with the ground to a set of steady-state conditions in contact with the ground, and then a second transition in the opposite direction between the sets of steady-state conditions, it is deliberately restricted to a portion of the signal which represents the condition that is to be analysed. This is because interactions between the mounted assembly and the ground may modify the local stiffness of the ground, which corresponds to an operation of compacting of the soil of the ground. The compaction of the soil can be visualized through the value of the plateau of the square-wave of the first signal. This evolves as the sensor passes through the contact patch. Depending on what information is being sought, it may be advantageous to restrict the measurement to certain zones of the contact patch.

According to one particular embodiment, the signal reduced from the first signal is defined as being the first half of the first signal.

The first part of the contact patch of the tyre casing lies facing ground that has been influenced only slightly by the mounted assembly. As a result, the identified value for the curvature of the tyre casing makes it possible to obtain an evaluation of the value of the relative firmness of the ground which is an intrinsic characteristic of ground not influenced by the passage of the mounted assembly over this ground. By reducing the first signal corresponding to the passing of the sensor through the contact patch to the first half of the first signal the analysis is thus focused on this intrinsic characteristic of ground that is said to have not been driven on.

According to another particular embodiment, the signal reduced from the first signal is defined as being the second half of the first signal.

The second part of the contact patch of the tyre casing lies facing ground that is said to have been driven on, that has been influenced by the tyre casing. As a result, the identified value for the curvature of the tyre casing makes it possible to obtain an evaluation of the value of the relative firmness of the ground which has been driven on and has been subjected to the passage of the mounted assembly. This item of data is a useful parameter because it corresponds to the state of the ground after the mounted assembly has passed over it. It is therefore a characteristic of the ground resulting from the action of the mounted assembly and of the vehicle.

According to one highly particular embodiment, the identification of the curvature values under steady-state conditions referred to as $\rho_j$ comprises the following steps:

Making the reduced signal symmetrical over an interval corresponding to the reduced signal in order to obtain a new signal in the form of a square wave.

This method makes it possible to generate a signal of the square-wave type. Thus it becomes possible to employ the same methods for identifying the curvature values as those employed in instances in which the analysis was focused on the entirety of the passage of the sensor through the contact patch.

BRIEF DESCRIPTION OF THE DRAWINGS

The invention will be better understood upon reading the following description, given solely by way of example and with reference to the appended figures, throughout which the same reference numerals denote identical parts, and in which.

DETAILED DESCRIPTION OF EMBODIMENTS

Figure 1:
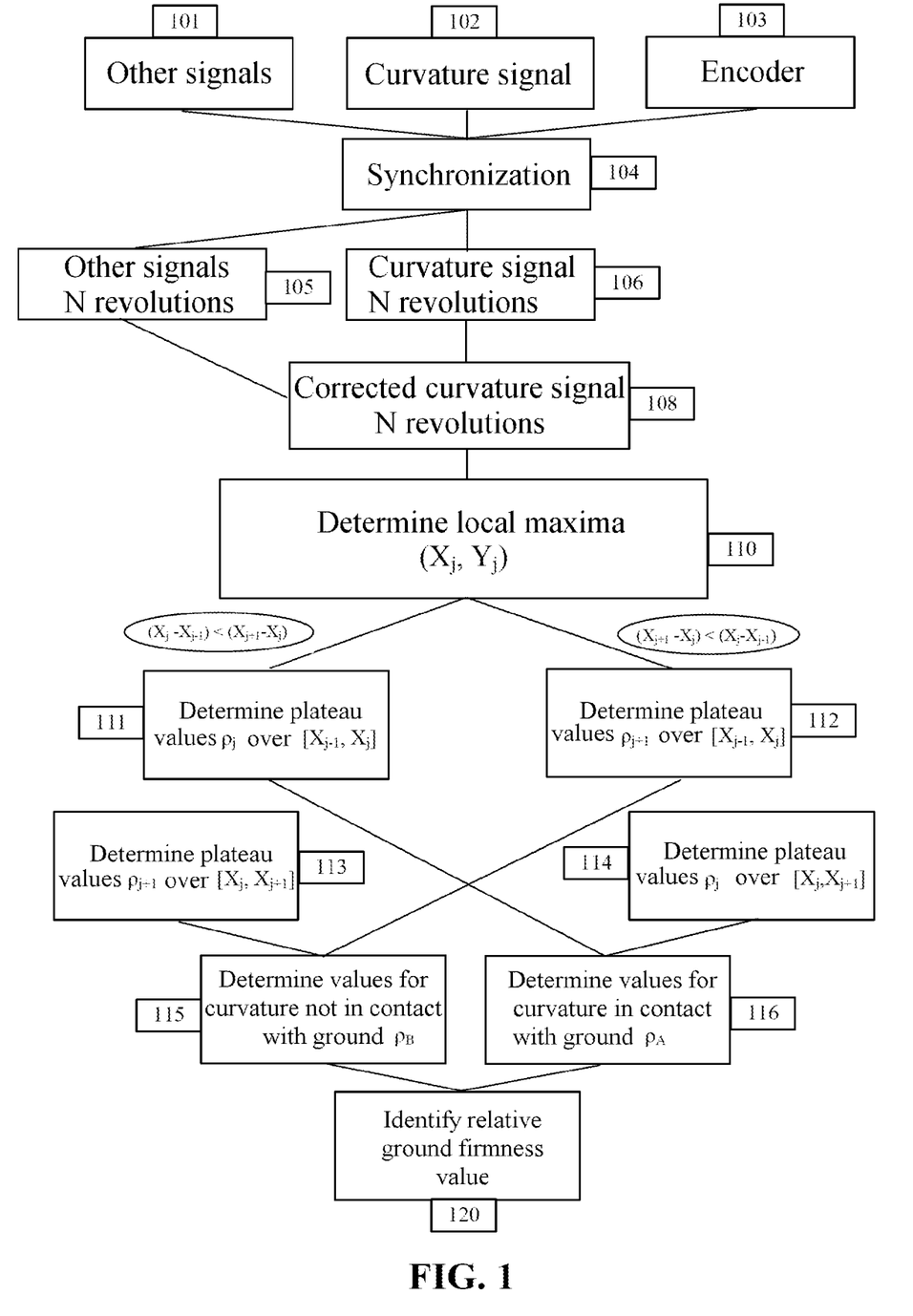
FIG. 1 shows a flowchart of the steps in the method for evaluating the firmness of the ground according to the invention.

FIG. 1 shows a flowchart of the various compulsory and optional steps regarding the method for evaluating the firmness of the ground. The starting point lies in a signal 102 emitted by a sensor sensitive to circumferential curvature. The spatial discretization of this signal needs to be sufficient to suitably describe the passage through the contact patch. A minimum of six measurement points in the contact patch is needed. This signal may be a direct measurement of the circumferential curvature via a bending sensor or an indirect measurement via, for example, a mono-axis accelerometer positioned radially with respect to the tyre casing or else a piezoelectric sensor the main direction of which is positioned circumferentially with respect to the tyre casing.

This signal may be supplemented by other signals 101 and 103 useful in exploiting the curvature signal 102. In particular, in instances in which the curvature signal 102 is influenced by variable parameters, it is necessary, in order to correct the curvature signal 102, also to record the variation of these variable parameters. In addition, a signal 103 of the encoder type or a revolution marker pulse is also needed in order to isolate the response of the signals over the revolution of the wheel of the mounted assembly. Of course, the synchronization 104 of all these signals is a prerequisite to any information-processing method. At the end of this first process, the method generates curvature signals 108 corresponding to a finite number N of revolutions of the wheel which have, if necessary, been corrected for the fluctuations in the variable parameters.

The second process consists in determining the values representative of the circumferential curvature in each of the steady-state conditions of the mounted assembly. What is meant here by "steady-state conditions" is that the boundary conditions applied to the crown zone of the tyre casing which is situated in line with the sensor are identical, namely either in contact with the ground or not in contact with the ground.

To this end, the great variations in curvature on entering and leaving the contact patch are put to good use to distinguish the zones of steady-state conditions in the signal from the sensor sensitive to curvature. In this way it is easy to determine the local maxima 110 on the curvature signal 108 corresponding to a finite number of revolutions of the wheel. Pairwise comparison of the ordinate values of these local maxima makes it possible easily to identify those parts of the signal 108 that correspond to one or other of the sets of steady-state conditions. Specifically, the size of the contact patch is necessarily small on the scale of the perimeter of the mounted assembly because of the toroidal shape of the tyre casing. Thus, comparing the distances between the ordinate values of the previous and next local maxima clearly indicates those zones of the tyre casing that are in contact or not in contact with the ground.

The curvature signal 108 corresponding to each of these zones delimited by the local maxima can be likened to a square-wave having two fronts with steep variation in curvature, separated by a plateau having a near-constant level of curvature. The isolated fronts correspond to the transition zones marking the transitions between the zones of steady-state conditions. The plateau corresponds to the zone that is stable in terms of boundary conditions applied to the crown of the tyre casing at which the measurement sensor is located. It is this part of the signal that will be subsequently exploited.

For each of these parts of the signal a value representative of curvature associated with the mounted assembly will be determined. This representative value is determined using mathematical methods of the minimum-value, median-value type, least-squares method, or using any other algorithm. The first representative value 111 or 113, denoted $\rho_j$ corresponds to the mean curvature under steady-state conditions of boundary conditions of the type reflecting contact with the ground. The second representative value 112 or 114, denoted $\rho_{j+1}$ denotes the mean curvature under steady-state conditions reflecting no contact with the ground. Finally, by averaging the representative values for each of the sets of steady-state conditions across the entire curvature signal 108, there are evaluated, on the one hand, a value for the curvature of the tyre casing under conditions of the type reflecting no contact with the ground 115, denoted $\rho_B$ and, on the other hand, a value for the curvature of the tyre casing of the type reflecting contact with the ground 116, denoted $\rho_A$.

This last process consists in evaluating the relative firmness of the ground 120 with respect to the radial stiffness of the mounted assembly from the values of curvature of the mounted assembly 115 and 116 considered individually or in combination. If the parameter associated with the circumferential curvature 116 under steady-state conditions of the type reflecting contact with the ground $\rho_A$ taking the stiffness of the ground into consideration is the most relevant, taking the circumferential curvature 115 with no contact with the ground $\rho_B$ into consideration quantitatively improves the determination of the firmness of the ground.

Optionally, it is possible to evaluate the firmness of the ground as the tyre casing sinks into the ground by focusing on the first half of the plateau of the square-wave signal in the direction of travel of the mounted assembly. This measurement is an intrinsic characteristic of the ground. It is also possible to measure the firmness of the ground over the second half of the contact patch, which provides access to the firmness of the ground that may have been modified by the passage of the mounted assembly. The discrepancy between these two distinctive ground-firmness characteristics makes it possible to work back to a parameter that can be likened to the compaction of the ground after the passage of the mounted assembly.

Figure 2:
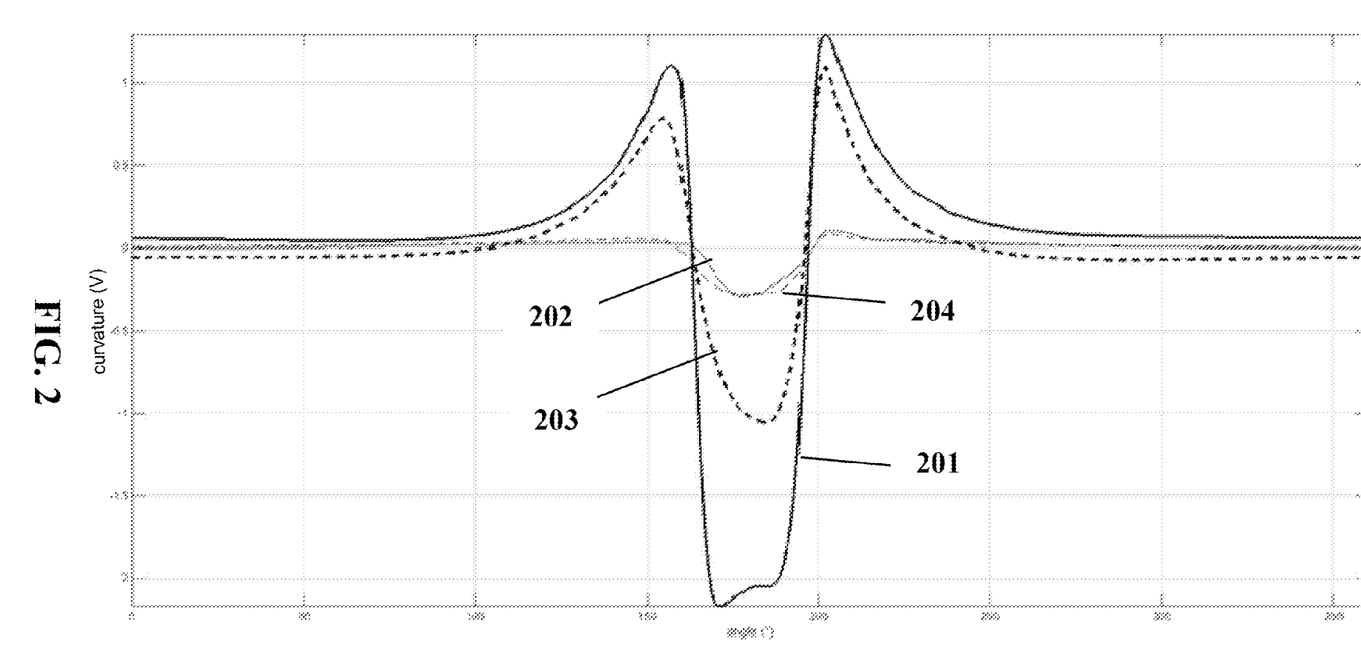
FIG. 2 shows the signals recorded by two sensors sensitive to circumferential curvature which are positioned either in line with a tread pattern element according to the invention, or in the space between two tread pattern elements.

FIG. 2 includes the responses of sensors of piezoelectric type which are sensitive to the circumferential curvature when these sensors are installed on a tyre casing of the Michelin Multibib make, size 650/60 R38 run on a Fendt Turbomatik Favorit 614 LSA tractor. This tyre casing has two series of lugs positioned on the lateral parts of the tread with an angular offset of one series with respect to the other. Specifically, each lug starts from the centre of the crown and extends in a direction that makes an angle of approximately 30 degrees alternately in the clockwise direction and in the anticlockwise direction with respect to the axis X toward the outside.

A first piezoelectric sensor is positioned on the inner liner of the tyre casing with the active part of the sensor fixed in line with a lug. In order to optimize the response of the signal, this sensor is situated as close as possible to the middle of the tread. A second sensor is positioned in line with an inter-lug zone, namely between two lugs. This sensor is also centred as best possible with respect to the width of the crown.

The mounted assembly will run over two types of ground with different firmnesses. The first ground is a road with a bitumen pavement with high stiffness. The second ground is an agricultural field without crops and which has not been ploughed for several days. Thus, the deformation experienced by the tyre casing between the two zones is different, and the sensor sensitive to the circumferential curvature is expected to be able to reflect these phenomena.

The mounted assembly is inflated to a pressure of 1.6 bar and the tractor runs at a constant speed of 10 km/h both on the road and in the agricultural field. The curves 201 and 203 depicted in bold line indicate the response of the first piezoelectric sensor the active part of which lies in line with a lug of the tread. The curves 202 and 204 depicted in fine line are the responses from the second sensor situated in the inter-lug zone. The curves 201 and 202 indicated in continuous line correspond to the running on the road, while the curves 203 and indicated in broken line correspond to the running in the agricultural field.

The signals observed are the mean, over 10 revolutions of the wheel, of the raw outputs from the piezoelectric sensor in volts over a complete revolution of the wheel. The origin for the angles is situated in the vertical direction, with Z positive in the Galilean frame of reference. The sharp change situated in the region of 180 degrees corresponds to the response of the sensor as it passes through the contact patch.

It may be seen fairly clearly that the response of the first sensor is correct according to expectation. A sharp change in its response can also be visualized by comparing the plateaus of the square waves of the curves 201 and 203 corresponding to the passage through the contact patch, which change is proportional to the stiffness of the ground and therefore to the curvature of the tyre casing.

By contrast, the response of the second sensor is not sufficiently discriminating. First of all, the amplitude of the response of the second sensor is markedly lower than that of the first sensor, particularly at the plateau of the square wave, compare curves 202 and 201 or 203 and 204. In addition, the amplitude of the response of the second sensor is similar, and this is true regardless of the nature of the ground, compare curves 202 and 204. As a result, it is indeed found that positioning the sensor in line with a tread pattern element in contact with the ground is a prerequisite for a quality evaluation of the firmness of the ground.

Thus, the sensor sensitive to the circumferential curvature of the tyre casing makes it possible, for the same conditions of use of the mounted assembly, namely for the same inflation pressure, the same applied load and the same running speed, to qualify ground in relative terms according to its firmness.

Figure 3A:
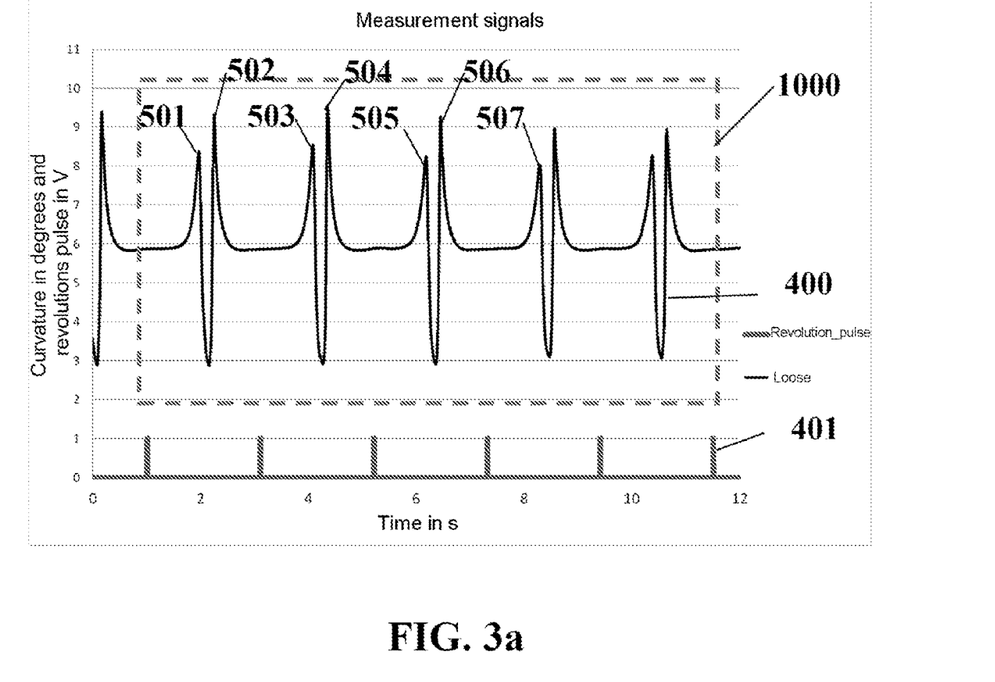
FIGS. 3a and 3b show the steps in the processing of a signal outputting the direct quantity for circumferential curvature.

FIG. 3a shows, on the one hand, a recording with respect to time of an electrical signal emitted by the sensor sensitive to the circumferential curvature, denoted 400 and, on the other hand, pulses from a revolutions marker encoder, denoted 401. The signals are synchronized and discretized at a sampling frequency of 2400 Hz.

The curvature sensor, of piezoelectric type, is installed on a tyre casing of the Michelin Multibib make, size 650/60 R38 run on a Fendt Turbomatik Favorit 614 LSA tractor. The tractor runs over ground of a certain stiffness at a constant speed of 10 km/h. The mounted assembly here is inflated to a pressure of 1.6 bar. The conversion for converting the output voltage of the sensor into curvature is provided. It would also have been possible to use the output signal of an accelerometer positioned in line with the tread pattern element delivering the radial acceleration of the tyre casing, having low-frequency filtered said signal and corrected it for the rotational speed of the mounted assembly. This rotational speed is determined, for example, using the wheel revolutions marker pulse.

Using a revolutions marker mounted on the axle of the tractor comprising the casing that is to be measured and generating Dirac pulses for each revolution of the wheel, a recorded signal corresponding to 5 revolutions of the wheel will be extracted. This recorded signal is the one contained inside the box 1000 drawn in dotted line.

It may be seen that this recorded signal contains 10 local maxima numbered from 501 onwards, namely two per revolution of the wheel. These local maxima correspond to the moment at which the sensor sensitive to the circumferential curvature enters or leaves the contact patch. The spatial separation between two adjacent local maxima differs greatly. Thus, considering one local maximum 506, the preceding and next local maxima 505 and 507 respectively are respectively close to, and distant from, the maximum 506. The circumferential length of the tyre casing in the contact patch being markedly smaller than the remaining circumferential length of the tyre casing, it is obvious that the maximum 505 corresponds to the entering of the contact patch and the maximum 506 to the leaving of the contact patch in the same revolution of the wheel. Finally, the maximum 507 is the entering of the contact patch in the next revolution of the wheel.

It is thus possible easily on the curve 400 to identify the response zones in which the sensor is in the contact patch or not in the contact patch. It will be noted that the response of the sensor exhibits a certain degree of stability whatever the geographical position of the mounted assembly within the field. The spatial discretization of the measurement is approximately five metres. This allows us to average the responses of the sensor over several revolutions of the wheel. If the reverse is true, then a revolution-by-revolution analysis is required. By coupling the wheel revolution information with the geographical position of the tractor in the field using, for example, a GPS (Global Positioning System), it is possible to obtain a map of the stiffness of a given surface with a more or less fine spatial discretization, by multiplying for example the ground firmness measurements. This multitude of measurements may be made up for example of a grid pattern produced with the aid of the movements of the tractor.

Figure 3B:
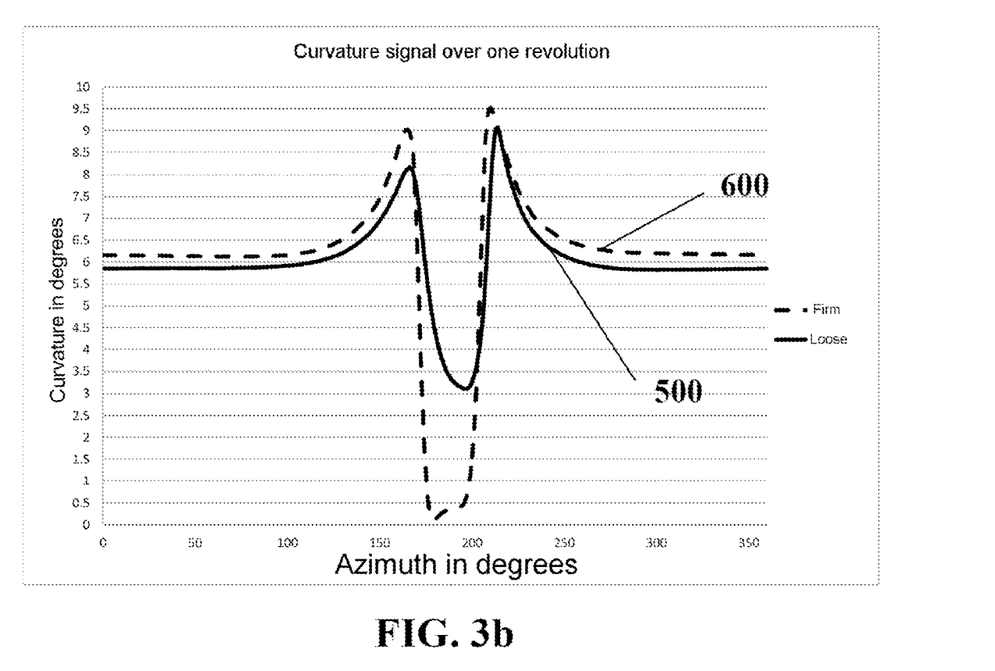

FIG. 3b contains the averages, over 5 revolutions of the wheel, of the responses of the curvature sensor mounted on the tyre casing driving either over loose ground 500 or over firm ground 600. The conditions of use of the tyre casing, namely chiefly the inflation pressure, the applied load and the speed of travel are identical.

It may be noted that the curvature of the tyre casing outside of the contact zone is near-constant with a curvature of approximately six degrees. Coherently, the curvature experienced by the tyre casing outside of the contact zone decreases if the mounted assembly is driving over loose ground by comparison with the curvature obtained on stiff ground.

Finally, the curvature in the contact zone differs greatly according to the nature of the ground. On firm ground, the curvature is small because of the flattening of the tyre casing. By contrast, on loose ground, although a drop in curvature is observed by comparison with the condition of not being in contact with the ground, the resulting curvature is still, in this instance, of the order of 50% of the curvature when not in contact with the ground.

In this case, the algorithm used for evaluating the curvature is the median value of the points across the entire plateau. Thus, for the curve 500 corresponding to the loose ground, a value of 3.2 degrees is identified for the curvature $\rho_{A'}$ in contact with the ground, and a value of 5.9 degrees is identified for the curvature $\rho_{B'}$ not in contact with the ground. Similarly, on the curve 600 for the firm type, a value of around 0.5 degrees is identified for the curvature p A in contact with the ground, and a value of around 6.1 degrees is identified for the curvature $\rho_B$ not in contact with the ground.

A first value of relative curvature, denoted C, and of the order of 0.54, is determined on loose ground, and a second value of relative curvature, denoted C' and of the order of 0.082 is determined on firm ground.

Prior to this, complementary measurements were undertaken on the mounted assembly. First of all, a numerical simulation campaign, in order to identify how the vertical stiffness of the mounted assembly changes as a function of inflation pressure. Thus, for nominal conditions of use of the mounted assembly in terms of pressure and in terms of applied load, simulations of the vertical stiffness of the mounted assembly were performed following a calculation of squashing on slippery ground to apply the load. This results in the identification of a power law for inflation pressure, of the type $(P)^\gamma$.

Next, an experimental calibration of the sensor sensitive to the circumferential curvature of the mounted assembly was performed, in order to identify the parameter α of the model. Thus, having previously set an inflation pressure for the mounted assembly that is within the range of service pressures of the mounted assembly, runnings at constant speed, at constant load and in a straight line were undertaken on three grounds of different firmness. Identification, using a least-squares method, allowed the coefficient α of the mounted assembly to be evaluated, namely in this instance, a value of 2.4.

Finally, using the calibration performed previously, a value of the order of 5.95 is obtained for the firmness of the firm ground relative to that of the loose ground, and this is correct because of the differentiated nature of the grounds.

In addition, with the inflation pressure of the same mounted assembly altered to 2.6 bar, curvature measurements for the same two grounds were undertaken.

For the firm ground, the measurement protocol identifies a value of around 1 degree for the curvature $\rho_{A'}$ in contact with the ground, and a value of around 6.1 degrees for the curvature $\rho_{B'}$ not in contact with the ground. As a result, a value of the order of 0.16 is identified as the relative curvature value C' for the firm ground.

For the loose ground, a value of around 4.3 degrees is identified for the curvature $\rho_A$ in contact with the ground, and a value of around 6.0 degrees is identified for the curvature $\rho_B$ not in contact with the ground. Therefore, the relative curvature value C for loose ground is of the order of 0.72. And similarly, a value of the order of 6.04 is obtained for the value of the firmness of the firm ground relative to that of the loose ground.

Finally, for this same mounted assembly, a value of the order of −0.4 is identified for coefficient β2 of the empirical law for a coefficient γ identified as being 0.79 describing the change in vertical stiffness of this mounted assembly with respect to inflation pressure.

The invention claimed is:

1. A method for evaluating firmness of a ground on which is running a vehicle equipped with at least one mounted assembly having a radial stiffness $k_{radial}$ comprising a tire casing having a crown, two sidewalls and two beads, equipped with at least one sensor sensitive to a circumferential curvature and positioned in line with the crown, comprising the following steps:
  estimating a value of a curvature p A of the tire casing corresponding to first steady-state conditions of the tire casing in contact with the ground; and
  evaluating a relative firmness of the ground with respect to the radial stiffness $k_{radial}$ of the at least one mounted assembly as being a function of the value of the curvature $\rho_A$ of the tire casing.

2. The method according to claim 1 further comprising:
  estimating a value of a curvature $\rho_B$ of the tire casing corresponding to second steady-state conditions of the tire casing not in contact with the ground; and
  evaluating the relative firmness of the ground with respect to the radial stiffness $k_{radial}$ of the at least one mounted assembly as being a function of the values of the curvature $\rho_A$ and $\rho_B$ of the tire casing.

3. The method according to claim 2 further comprising:
  establishing a relative curvature C as being a ratio $\rho_A/\rho_B$ of the curvatures of the tire casing in contact or not in contact with the ground; and
  evaluating the relative firmness of the ground with respect to the radial stiffness $k_{radial}$ of the at least one mounted assembly as being a function of the relative curvature C.

4. The method according to claim 3 further comprising:
  evaluating the relative firmness of the ground with respect to the radial stiffness $k_{radial}$ of the at least one mounted assembly by applying the following formula in which the parameters α, β1 and β2 are coefficients dependent on the at least one mounted assembly and P is the inflation pressure of the mounted assembly:

$$\frac{k_{ground}}{k_{radial}} = \frac{|1 + \alpha * C - (1+\alpha) * C^2|}{\beta_1 * P^{\beta_2} * C}.$$

5. The method according to claim 1, wherein, with the tire casing defining a contact patch, by applying nominal conditions of use of the at least one mounted assembly, the contact patch having a dimension Ladc in an axial direction of the at least one mounted assembly, the at least one sensor, upon each measurement, evaluates the mean circumferential curvature over a length comprised between 10% and 80% of the dimension Ladc.

6. The method according to claim 5, wherein, with the tire casing defining a contact patch having a dimension ladc in a transverse direction of the at least one mounted assembly, the at least one sensor, upon each measurement, evaluates a mean circumferential curvature over a width comprised between 10% and 80% of the width ladc.

7. The method according to claim 1, wherein the at least one sensor measures a mean curvature of a zone of the crown of the tire casing in contact with the ground that is homogeneous in terms of radial stiffness.

8. The method according to claim 1, wherein the at least one sensor measures a mean curvature of a zone of the crown in line with a tread pattern element of the tire casing.

9. The method according to claim 2, wherein the estimation of the curvature values corresponding to the first and second steady-state conditions in terms of boundary conditions of the tire casing comprises the following steps:
obtaining a recorded signal from the at least one sensor sensitive to curvature corresponding to N revolutions of the wheel of the mounted assembly, N being an integer strictly greater than 1;
identifying in the recorded signal the 2N local maxima $Y_{2N}$, and corresponding abscissa values $X_{2N}$;
for any j, being an integer strictly greater than 1 and strictly less than 2N, if $(X_j - X_{j-1}) < (X_{j+1} - X_j)$,
  (a) isolating a first signal in the recorded signal between the central maximum $(X_j, Y_j)$ and a previous maximum $(X_{j-1}, Y_{j-1})$;
  (b) identifying the steady-state conditions curvature value denoted $\rho_j$ in the first signal;
  (c) isolating a second signal in the recorded signal between the central maximum $(X_j, Y_j)$ and the next maximum $(X_{j+1}, Y_{j+1})$; and
  (d) identifying the steady-state conditions curvature value denoted $\rho_{j+1}$ in the second signal;
and if $(X_j - X_{j-1})$ is not less than $(X_{j+1} - X_j)$,
  (a) isolating a first signal in the recorded signal between the central maximum $(X_j, Y_j)$ and the next maximum $(X_{j+1}, Y_{j+1})$;
  (b) identifying the steady-state conditions curvature value denoted $\rho_j$ in the first signal;
  (c) isolating a second signal in the recorded signal between the central maximum $(X_j, Y_j)$ and the previous maximum $(X_{j-1}, Y_{j-1})$; and
  (d) identifying the steady-state conditions curvature value denoted $\rho_{j+1}$ in the second signal; and
establishing the curvature of the tire casing under conditions of contact with the ground $\rho_A$ as being the mean of the at least one curvature value $\rho_j$ and the curvature of the tire casing under conditions not in contact with the ground $\rho_B$ as being the mean of the at least one curvature value $\rho_{j+1}$.

10. The method according to claim 9, wherein the obtaining of the recorded signal from the at last one sensor sensitive to the curvature corresponding to N revolutions of the wheel of the mounted assembly comprises the following steps:
recording a signal emitted by the at least one sensor sensitive to the curvature corresponding to one revolution of the wheel of the mounted assembly; and
periodizing the signal emitted over N periods, N being an integer greater than 1.

11. The method according to claim 9, wherein, with the at least one sensor outputting an indirect parameter for the circumferential curvature of the tire casing involving at least one parameter that is variable, the method further comprises:
correcting the indirect parameter on the signal recorded using the at least one variable parameter.

12. The method according to claim 9, wherein the curvature of the tire casing under conditions of contact with the ground $\rho_j$ is evaluated on a signal reduced from the first signal.

13. The method according to claim 12, wherein the signal reduced from the first signal corresponds to the first half of the first signal.

14. The method according to claim 12, wherein the signal reduced from the first signal corresponds to the second half of the first signal.

15. The method according to claim 13, wherein the identification of the values for curvature under conditions of contact with the ground $\rho_j$ comprises making the reduced signal symmetrical over an interval corresponding to the reduced signal in order to obtain a new signal in the form of a square wave.

16. The method according to claim 14, wherein the identification of the values for curvature under conditions of contact with the ground $\rho_j$ comprises making the reduced signal symmetrical over an interval corresponding to the reduced signal in order to obtain a new signal in the form of a square wave.

* * * * *